(12) United States Patent
Liu et al.

(10) Patent No.: US 6,348,266 B1
(45) Date of Patent: Feb. 19, 2002

(54) AMPHIPHILLIC LUBRICANTS FOR MAGNETIC MEDIA

(75) Inventors: Youmin Liu, Palo Alto; Vidya Gubbi, Milpitas; Chung Shih, Cupertino, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/386,145

(22) Filed: Aug. 31, 1999

Related U.S. Application Data

(60) Provisional application No. 60/101,348, filed on Sep. 22, 1998, and provisional application No. 60/101,356, filed on Sep. 22, 1998.

(51) Int. Cl.$^7$ .............................................. G11B 5/725
(52) U.S. Cl. ................ 428/421; 428/422; 428/694 TF; 428/900; 427/130; 427/131
(58) Field of Search ................... 428/421, 422, 428/694 TF, 900; 427/130, 131

(56) References Cited

U.S. PATENT DOCUMENTS

| | | |
|---|---|---|
| 3,250,807 A | 5/1966 | Fritz et al. |
| 4,085,137 A | 4/1978 | Mitsch et al. |
| 4,174,461 A | 11/1979 | Sianesi et al. |
| 4,267,238 A | 5/1981 | Chernega |
| 4,268,556 A | 5/1981 | Pedrotty |
| 4,647,413 A | 3/1987 | Savu |
| 4,696,845 A | 9/1987 | Yanagisawa |
| 5,128,216 A * | 7/1992 | Ng ............................... 428/695 |
| 5,431,833 A | 7/1995 | Kondo et al. |
| 5,453,539 A | 9/1995 | Kondo et al. |
| 5,506,309 A | 4/1996 | Biershenk et al. |
| 5,631,081 A | 5/1997 | Lin et al. |
| 5,718,833 A | 2/1998 | Yamamoto et al. |
| 5,725,945 A * | 3/1998 | Kohno et al. ................. 428/341 |
| 5,750,747 A * | 5/1998 | Furutani et al. ............... 554/36 |
| 5,776,602 A | 7/1998 | Ueda et al. |
| 5,789,534 A | 8/1998 | Koike et al. |
| 5,962,117 A * | 10/1999 | Furutani et al. ............. 428/219 |
| 6,083,626 A * | 7/2000 | Yanagisawa ................. 428/421 |

FOREIGN PATENT DOCUMENTS

| | | |
|---|---|---|
| JP | 63-071922 | 9/1986 |

* cited by examiner

*Primary Examiner*—Stevan A. Resan
(74) *Attorney, Agent, or Firm*—McDermott, Will & Emery

(57) ABSTRACT

A magnetic recording medium including a lubricant topcoat having increased bonding to the medium surface comprises an amphiphilic lubricant molecule having a hydrophilic central portion including a plurality of polar functional groups bound to the medium surface and a pair hydrophobic fluoroalkyl ether or perfluoroalkylether end portions at respective ends of the hydrophilic central portion and extending away from the medium surface.

12 Claims, 2 Drawing Sheets

AMPHIPHILLIC LUBRICANTS FOR MAGNETIC MEDIA

CROSS-REFERENCE TO PROVISIONAL APPLICATIONS

This application claims priority from provisional patent application Ser. Nos. 60/101,348 and 60/101,356, each filed Sep. 22, 1998, the entire disclosures of which are herein incorporated by reference.

FIELD OF THE INVENTION

The present invention relates to the recording, storage and reading of magnetic data, particularly rotatable magnetic recording media, such as thin film magnetic disks having textured surfaces and a lubricant topcoat for contact with cooperating magnetic transducer heads.

BACKGROUND OF THE INVENTION

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk, where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk, and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve mechanical polishing or laser texturing the surface of a disk substrate to provide a texture thereon prior to subsequent deposition of layers, such as an underlayer, a magnetic layer, a protective overcoat, and a lubricant topcoat, wherein the texture on the surface of the substrate is intended to be substantially replicated in the subsequently deposited layers.

A typical longitudinal recording medium is depicted in FIG. 1 and comprises a non-magnetic substrate 10, typically an aluminum (Al)-alloy, such as an aluminum-magnesium (Al—Mg)-alloy, plated with a layer of amorphous nickel-phosphorus (NiP). Alternative substrates include glass, glass-ceramic materials, and graphite. Substrate 10 typically includes, sequentially deposited on each side thereof, a chromium (Cr) or a Cr-based alloy underlayer 11, 11', a cobalt (Co)-based alloy magnetic layer 12, 12', a protective overcoat 13, 13', typically containing carbon (C), and a lubricant topcoat 14, 14'. Cr underlayer 11, 11' can be applied as a composite comprising a plurality of sub-underlayers 11A, 11A'. Cr underlayer 11, 11', Co-based alloy magnetic layer 12, 12' and protective overcoat 13, 13', typically containing carbon, are usually deposited by sputtering techniques performed in an apparatus containing sequential deposition chambers. A conventional Al-alloy substrate is provided with a NiP plating, primarily to increase the hardness of the Al substrate, serving as a suitable surface to provide a texture, which is substantially reproduced on the disk surface.

In accordance with conventional practices, a lubricant topcoat is uniformly applied over the protective layer to prevent wear between the disk and head interface during drive operation. Excessive wear of the protective overcoat, typically comprising carbon, increases friction between the head and disk, thereby causing catastrophic drive failure. Excess lubricant at the head-disk interface causes high stiction between the head and disk. If stiction is excessive, the drive cannot start and catastrophic failure occurs. Accordingly, the lubricant thickness must be optimized for stiction and friction.

Liquid lubrication of the disk surface has at least two problems which limit its effectiveness as used in rotating storage media. First, the lubricant does not have a retention means so that when the disk rotates, the lubricant spins off the disk. The depletion of the lubricant thickness from the disk surface increases the friction between the disk and the read/write head. Second, the depletion of the thickness of the lubricant is not uniform across the surface of the disk. Where the thickness is too thin, the head can cause wear on the disk surface. Where the lubricant thickness is too great, the head will become stuck in the lubricant (from static friction) and the head or disk could be damaged when the head suddenly becomes unstuck due to the rotating disk. Other failure modes include the inability of the spindle motor to start at all due to the static friction and failure of the mechanical suspension assembly. These effects are present even though the depletion is radial in nature.

A significant factor in the performance of a lubricant topcoat is the amount of lubricant which tightly adheres to the magnetic medium, as by chemical bonding forces operating between functional groups of the lubricant molecule and the surface of the recording medium. Typical conventional lubricants, such as perfluoroalkylpolyether (PFPE) fluids such as Fomblin Z-DOL, Fomblin Tx., and Fomblin Z-Tetraol, etc., generally are comprised of molecules having 2–4 polar groups at either end of a linear molecule. The polar end-groups provide bonding of the lubricant molecules to the surface of the magnetic medium. However, polar end-functional groups are not necessarily chemically inert and consequently, such conventional lubricants may disadvantageously undergo chemical reactions prior to their application to the magnetic medium tending to decrease their bonding potential. Moreover, the conventional perfluoroalkylpolyether-based lubricants do not have an optimal molecular structure or conformation considered necessary for the increased demands of magnetic medium lubricity.

One way in which to increase bonding of the lubricant to the disk surface and therefore prevent the depletion of lubricant therefrom has been to thermally bond the lubricant to the disk surface. However, this technique disadvantageously increases the exposure of the magnetic media to corrosion and degrades the reliability of the disk. Another technique is to use a process employing exposure to high energy electron beams. The lubricant is exposed to electron beams having an energy above ten KeV. This process has been shown to produce a modified lubricant film bonded to the disk surface. However, the modified film does not contain all the required lubricating properties of the unmodified film.

Thus, a significant factor in the performance of recording media is the quality and character of the topcoat lubricant. Lubricant topcoats comprised of conventional polymeric materials as described above are typically applied as a heterogeneous mixture of different molecular weight species. The use of such mixtures, however, results in dispersal or variation of the properties thereof, depending upon the relative amounts of each molecular weight fraction present in the mixture. As a consequence, use of polymer mixtures incurs difficulties in maintaining uniform processing conditions and product quality.

It is also desirable for improved media performance to employ lubricants which form an effective functional topcoat at a thickness less than those of conventionally utilized lubricants. As indicated above, perfluoropolyether lubricants with one or more functionalized end-groups are conventionally employed for recording media topcoats. The functionalized end-groups of these compounds are considered necessary to provide direct bonding, and thus, improved adhesion of the lubricant topcoat to the recording media. It is also believed, however, that for functionalized perfluoropolyether lubricants to provide the requisite tribology, they must be applied at a relatively high topcoat thickness, particularly when the recording medium is expected to perform under high stress conditions.

Perfluoropolyether lubricants with nonfunctionalized end-groups are also known. However, such lubricants have not found significant use as disk lubricants since they typically suffer from poor wear resistance. Moreover, commercially available terminally nonfunctional perfluoropolyether lubricants typically have wide and varying distributions of molecular weight components.

In view of the criticality of the lubricant topcoat, there is a continuing need for improved bonding of the lubricant to the magnetic recording medium, particularly to a carbon-based protective overcoat. There also exists a need for a lubricant topcoat providing improved stiction and wear performance, particularly under conditions of high stress, temperature, and humidity. There is also a need for lubricants which form functionally effective topcoats on recording media at a thickness less than conventional lubricant topcoats.

SUMMARY OF THE INVENTION

An advantage of the present invention are improved lubricants suitable for use as topcoats for magnetic recording media, wherein the lubricants comprise amphiphilic molecules having a central polyfunctional polar group moiety and a pair of fluoroalkyl ether end groups at respective ends of the central moiety.

Another advantage of the present invention is a magnetic recording medium comprising a lubricant topcoat thereon exhibiting good stiction and wear resistance, wherein the lubricant topcoat comprises an amphiphilic lubricant molecule.

Yet another advantage of the present invention is a method of manufacturing a magnetic recording medium having a lubricant topcoat comprising an amphiphilic lubricant molecule.

A still further advantage of the present invention is a method of making a symmetrically configured, amphiphilic lubricant.

Additional advantages and other features of the invention will be set forth in part in the description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other advantages are achieved in part by a substrate having a surface; and a lubricant topcoat on said substrate surface, wherein the lubricant topcoat comprises an amphiphilic lubricant molecule having a hydrophilic central portion including a plurality of polar functional groups and a pair of hydrophobic fluoroalkylether or perfluoroalkylether end portions at respective ends of the hydrophilic central portion.

According to embodiments of the present invention, the hydrophilic central portion of the lubricant molecule comprises an ester or amide; the lubricant has a molecular weight distribution of about 1.0; comprises a single molecular weight species; and the lubricant molecule has the formula:

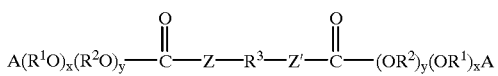

wherein:
  A is alkyl, haloalkyl, alkoxy, haloalkoxy, aryl, or haloaryl;
  $R^1$ and $R^2$ are independently $C_{1-10}$ fluoroalkyl, or $C_{1-10}$ perfluoroalkyl;
  Z and Z' are independently nitrogen, or oxygen;
  x and y are between about 1 to about 10; and
  $R^3$ is alkylene, arylene, halosubstituted alkylene or arylene, or $(R-J)_m-R'$; wherein R and R' are independently alkylene or arylene, or halosubstituted alkylene or arylene, J is NH, O, S, S—S, $SO_2$, C(O), or C(S) and m is 1–4.

According to particular embodiments of the present invention, the magnetic recording medium comprises: a substrate; an underlayer on the substrate; a magnetic layer on the underlayer; and the lubricant topcoat on the magnetic layer.

According to another aspect of the present invention, a method of manufacturing a magnetic recording medium comprises the sequential steps of:
  (a) depositing a magnetic layer on a substrate;
  (b) forming a protective overcoat layer over the magnetic layer; and
  (c) depositing a lubricant layer on the protective overcoat layer to form a lubricant topcoat; wherein the lubricant topcoat comprises an amphiphilic lubricant molecule having a hydrophilic central portion including a plurality of polar functional groups and a pair of hydrophobic fluoroalkylether or perfluoroalkylether end portions at respective ends of the hydrophilic central portion.

According to embodiments of the present invention, step (c) comprises exposing the surface of the protective overcoat to a vapor comprising the lubricant or applying a solution of the lubricant in a solvent to the surface of the protective overcoat, the solvent being at least one selected from the group consisting of esters, ketones, alcohols, and fluorinated compounds.

According to particular embodiments of the present invention, the solvent is at least one selected from the group consisting of ethyl acetate, ethanol, and acetone; and the lubricant molecule has the formula:

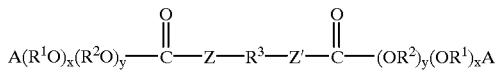

wherein:

A is alkyl, haloalkyl, alkoxy, haloalkoxy, aryl, or haloaryl;

$R^1$ and $R^2$ are independently $C_{1-10}$ fluoroalkyl, or $C_{1-10}$ perfluoroalkyl;

Z and Z' are independently nitrogen or oxygen;

x and y are between about 1 to about 10; and $R^3$ is alkylene, arylene, halosubstituted alkylene or arylene, or $(R-J)_m-R'$; wherein R and R' are independently alkylene or arylene, or halosubstituted alkylene or arylene, J is NH, O, S, S—S, $SO_2$, C(O), or C(S) and m is 1–4.

According to yet another aspect of the present invention, a method of producing a symmetrically configured amphiphilic lubricant compound having formula (I)

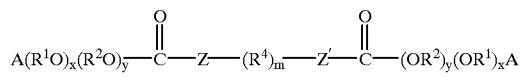

comprises chemically combining two molecules of a compound of formula (II):

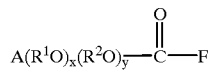

with one molecule of a compound of formula (III)

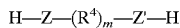

wherein:

A is alkyl, haloalkyl, alkoxy, haloalkoxy, aryl, or haloaryl;

$R^1$ and $R^2$ are independently $C_{1-10}$ fluoroalkyl, or $C_{1-10}$ perfluoroalkyl;

Z' and Z are independently nitrogen, or oxygen;

x and y are between about 1 to about 10;

m is 1 to 4; and $R^4$ is alkylene, alkylene-oxy, alkylene-thio, alkylene-dithio, alkylene-sulfonyl, or halosubstitued derivatives thereof.

According to particular embodiments of the present invention, the method comprises producing a compound of formula:

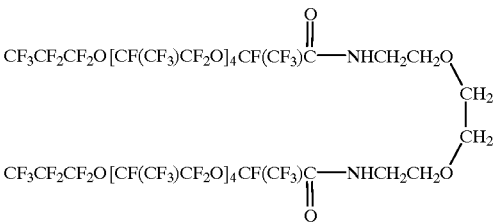

Additional advantages of the present invention will become readily apparent to those having ordinary skill in the art from the following detailed description, wherein the embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The following detailed description of the embodiments of the present invention can best be understood when read in conjunction with the following drawings, wherein.

DESCRIPTION OF THE INVENTION

Figure 2:
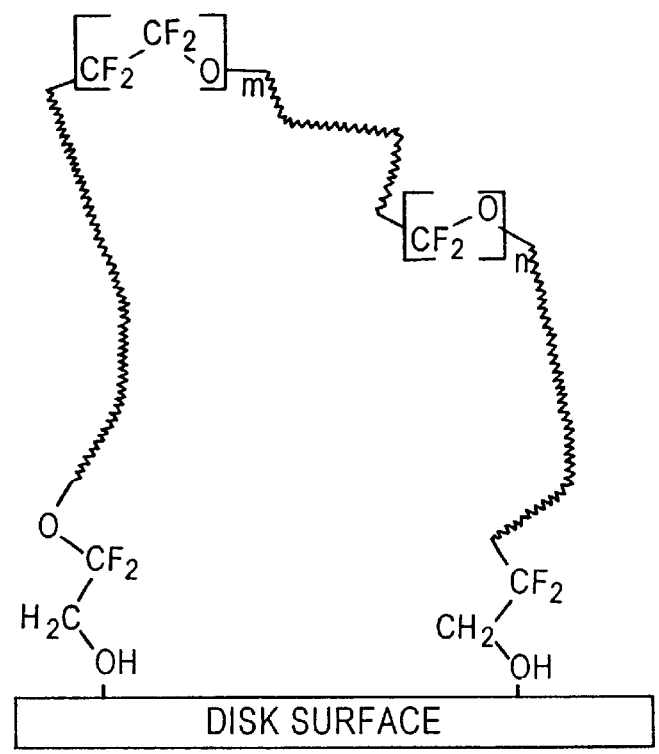
FIGS. 2 and 3, respectively, schematically illustrate the as-bonded states and conformations of PFPE lubricant molecules according to the conventional art and symmetrically configured, amphiphilic lubricant molecules according to the present invention.

The present invention stems from the recognition by the present inventors that conventionally configured PFPE-type lubricants utilized as topcoats for magnetic recording media do not have optimal molecular configurations and properties conducive for strong bonding to magnetic recording media surfaces, e.g., carbon-based protective overcoats. Adverting to FIG. 2, shown therein is a schematic representation of the bonding state/configuration of a conventional PFPE-based lubricant (e.g., Fomblin Zdol, Ausimont). As is evident therefrom, such type lubricant molecules comprise two OH groups at the opposite ends of a long polymer chain or backbone, which polar functional groups are utilized for bonding to the media surface. Such configuration possesses several drawbacks, i.e., (1) the polar functional groups are not completely inert and may provide insufficient bonding of the lubricant molecule to the media surface; (2) the polar end-groups tend to be bound to the media surface thereby forcing the polymer chain or backbone in a disorderly configuration above the media surface. Moreover, PFPE-base lubricants typically consist of heterogeneous mixture of different molecular weight species, which degrade tribological properties.

Figure 3:
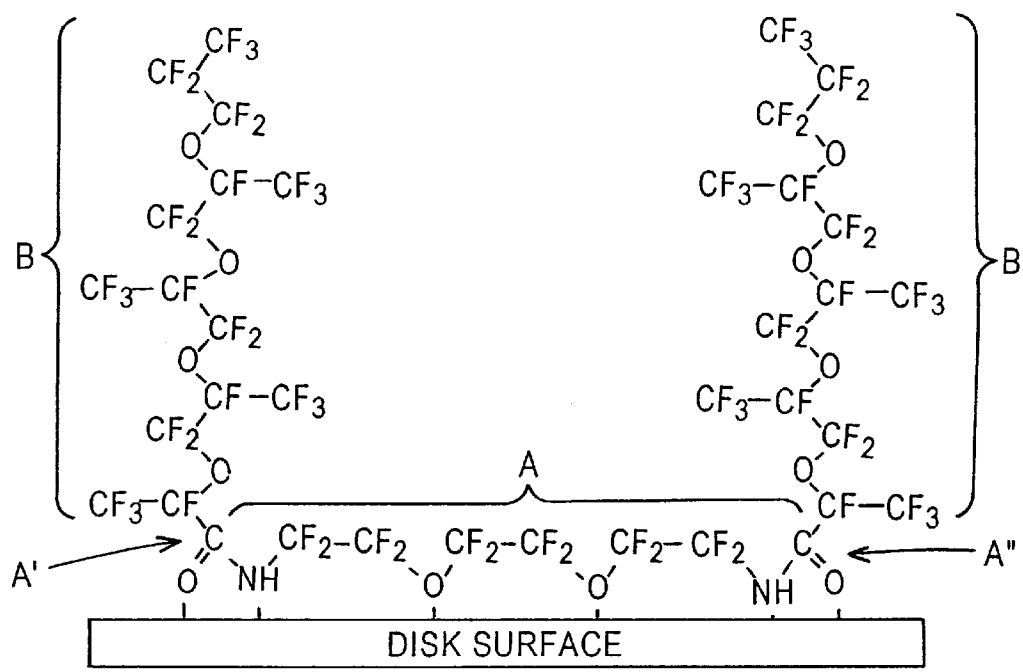

Referring now to FIG. 3, shown therein is a schematic representation of the bonding state/configuration of amphiphilic lubricant molecule according to the present invention. As employed herein, the term "amphiphilic" denotes a molecule having both a hydrophobic moiety or portion and a polar, hydrophilic moiety or portion. Thus the illustrated lubricant molecule according to the present invention ("LC4", alternatively 3,6-dioxaoctane bis(perfluoro-2,5,8,11-tetramethyl-3,6,9,12-tetraoxapentadecanoyl amide or perfluorinated tetramethyl alkyl ether diamide), comprises a hydrophilic central portion A of length sufficient to extend parallel to and over a portion of the media surface and includes a substantial plurality of polar functional groups or atoms, illustratively nitrogen and oxygen atoms or groups containing same, for bonding therewith in a monolayer thickness, as by dipole-dipole interaction (as indicated by short solid lines in the figure). A pair of hydrophobic end portions B extend from respective ends A', A" of the hydrophilic central portion A in the direction away from the media surface, thereby providing a uniform monolayer thickness of lubricant directly bonded to the surface of the magnetic medium.

The inventive lubricants are designed and synthesized to have an accurately defined chemical formula or structure and a single molecular weight species, whereby the physical properties thereof are not influenced by molecular weight distribution. As a consequence of the defined structure and single molecular weight, the inventive lubricants are thus readily adaptable for coating on media surfaces by a vapor lube process, without fractionation.

The inventive lubricant molecules can be represented by the following formula:

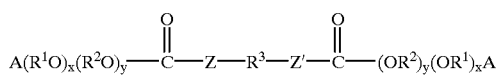

wherein:
A is alkyl, haloalkyl, alkoxy, haloalkoxy, aryl, or haloaryl;
$R^1$ and $R^2$ are independently $C_{1-10}$ fluoroalkyl, or $C_{1-10}$ perfluoroalkyl;
Z and Z' are independently nitrogen, or oxygen;
x and y are between about 1 to about 10; and
$R^3$ is alkylene, arylene, halosubstituted alkylene or arylene, or $(R-J)_m-R'$; wherein R and R' are independently alkylene or arylene, or halosubstituted alkylene or arylene, J is NH, O, S, S—S, $SO_2$, C(O), or C(S) and m is 1–4.

Thus, the present invention is directed to a class of lubricants which can be advantageously employed as lubricant topcoats on magnetic recording media with an increased degree of direct bonding to the magnetic media vis-à-vis conventional PFPE-based lubricants, especially when applied to a protective overcoat. The lubricants of the present invention can be bonded in a controlled manner to various protective overcoat materials, including, e.g., carbon, silicon dioxide, hydrogenated carbon, nitrogenated carbon, and graphitic carbon as a highly oriented monolayer, thereby advantageously reducing topcoat thickness. A particularly advantageous characteristic of the inventive class of lubricants is the ability to tailor their molecular configuration to achieve a controlled affinity for a particular topcoat material and surface topography, thereby providing a controlled "bonded lube" ratio and protection against degradation/disbonding resulting from moisture penetration/absorption, as under exposure to conditions of high humidity. For example, the chain length of the hydrophobic end portions B can be easily changed from short to long and from hydrocarbon to fluorocarbon segments, or to a combination of both. Consequently, the inventive class of lubricants can be tailored as to be readily and effectively applied to various protective topcoat materials with a controlled bonded lube ratio and attendant reduction in stiction, while providing an increase in wear resistance and durability.

In an embodiment of the present invention, the lubricant molecules comprise stable, single molecular weight (i.e., a molecular weight distribution of about 1), symmetrically configured, amphiphilic molecules having a hydrophilic central portion including a plurality of polar functional groups for providing bonding to the surface of a magnetic recording media, and a pair of substantially identical, elongated hydrophobic fluoroalkylether or perfluoroalkylether end portions at opposite ends of the hydrophilic central portion adapted for extending in the direction away from the media surface for providing improved tribology.

Several specific examples of amphiphilic lubricants according to the present invention, designated LC-4, LC-5, LC-6, and LC-7, and their respective molecular weights, are given in Table 1 below.

TABLE 1

| Lubricant Compound | Formula Weight |
|---|---|
| 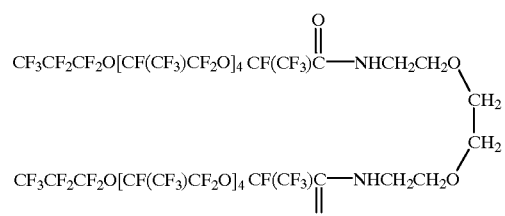 LC4 | 1768.6 |
| 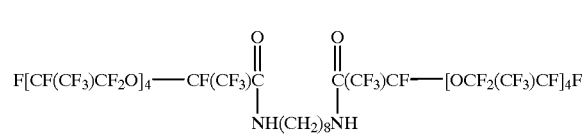 LC5 | 1765.2 |

TABLE 1-continued

| Lubricant Compound | Formula Weight |
|---|---|
| F[CF(CF$_3$)CF$_2$O]$_4$—CF(CF$_3$)C(O)—[NH(CH$_2$CH$_2$O)$_2$CH$_2$CH$_2$NH]—C(O)(CF$_3$)CF—[OCF$_2$(CF$_3$)CF]$_4$F<br>LC6 | 1768.9 |
| F[CF(CF$_3$)CF$_2$O]$_4$—CF(CF$_3$)C(O)—[NH(CH$_2$)$_2$NH(CH$_2$)$_2$NH]—C(O)(CF$_3$)CF—[OCF$_2$(CF$_3$)CF]$_4$F<br>LC7 | 1724.4 |

In each case, the viscosity of the above-listed lubricants exceeds that of Fomblin Z Tetraol (Ausimont).

The inventive compounds are conveniently synthesized according to a reaction scheme as illustrated below:

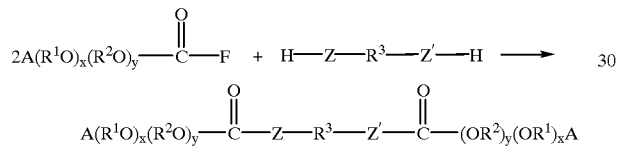

$$2A(R^1O)_x(R^2O)_y-C(O)-F + H-Z-R^3-Z'-H \longrightarrow$$

$$A(R^1O)_x(R^2O)_y-C(O)-Z-R^3-Z'-C(O)-(OR^2)_y(OR^1)_xA$$

wherein:

A is alkyl, haloalkyl, alkoxy, haloalkoxy, aryl, or haloaryl;

$R^1$ and $R^2$ are independently $C_{1-10}$ fluoroalkyl or $C_{1-10}$ perfluoroalkyl;

Z' and Z are independently nitrogen, oxygen or sulfur;

x and y are between 1 and 10; and $R^3$ is alkylene, arylene, halosubstituted alkylene or arylene, or $(R-J)_m-R'$; wherein R and R' are independently alkylene or arylene, or halosubstituted alkylene or arylene, J is NH, O, S, S—S, SO$_2$, C(O), or C(S) and m is 1–4.

(2) reduce the temperature of the thus-prepared solution to about 0° C., as by cooling with ice;

(3) add the selected $A(R^1O)_x(R_2O)_y$—C(O)—F compound (e.g., a perfluoro ether) to the cooled solution in a molecular ratio slightly greater than 2:1;

(4) permit the reaction mixture to stand at room temperature for about 24 hours;

(5) separate the crude product from the solvent by evaporating the solvent; and (6) purify and isolate the desired compound by chromatography.

A variety of fluoro and perfluoro ether compounds for forming the hydrophobic end portions may be utilized for reaction according to the above process scheme with a variety of diamino compounds for forming the hydrophilic central portions.

In a particular embodiment $R^3$ is $(R^4)_m$ wherein $R^4$ is alkylene, alkylene-oxy, alkylene-thio, alkylene-dithio or alkylene-sulfonyl or halosubstituted derivatives thereof and m is 1–4. By way of example, a general synthetic route utilizing perfluoro ether compounds and diamines to form LC4 and LC$_n$ type lubricants and analogs thereof can be represented as follows:

$$2 \text{ F[CF(CF}_3\text{)CF}_2\text{O]}_n\text{CF(CF}_3\text{)C(O)F} + \text{NH}_2-(R^4)_m-\text{NH}_2$$

$$\downarrow \text{C}_5\text{H}_5\text{N (Pyridine) or C}_5\text{F}_5\text{N (Perfluoropyridine)}$$

$$\text{F[CF(CF}_3\text{)CF}_2\text{O]}_n\text{CF(CF}_3\text{)C(O)}-\text{NHCH}_2(R^4)_m\text{CH}_2\text{NH}-\text{(O)C(CF}_3\text{)CF[OCF}_2\text{(CF}_3\text{)CF]}_n$$

By way of illustration, but not limitation, the above-illustrated synthesis can be performed according to the following procedure, which yields products having a single molecular weight species and an impurity level of less than about 0.1%, as determined by chromatographic and other analytical methods:

(1) mix the selected H—Z—R$^3$—Z'—H compound, e.g., a diamine, with a suitable solvent, e.g., pyridine or perfluoropyridine, at room temperature to form a solution;

Examples of diamines which may be utilized in the above reaction scheme include:

| | |
|---|---|
| NH$_2$CH$_2$CH$_2$OCH$_2$CH$_2$OCH$_2$CH$_2$NH$_2$ | 1,8-diamino-3,6-doxaoctane |
| H$_2$NCH$_2$CH$_2$NH$_2$ | ethylene diamine |
| H$_2$NCH$_2$CH$_2$SSCH$_2$CH$_2$NH$_2$ | cystamine |
| H$_2$NCH$_2$CH$_2$CH$_2$NH$_2$ | 1,3-diaminopropane |

-continued

| | |
|---|---|
| H$_2$NCH$_2$C(O)CH$_2$NH$_2$, 2HCl.H$_2$O | 1,3-diaminoacetone dihydrochloride monohydrate |
| H$_2$NCH$_2$CH$_2$CH$_2$CH$_2$NH$_2$ | 1,4-diaminobutane |
| H$_2$NCH$_2$C(O)CH$_2$CH$_2$NH$_2$, 2HCl | 1,4-diamino-2-butanone dihydrochloride |
| H$_2$NCH$_2$(CH$_2$)$_6$CH$_2$NH$_2$ | 1,8-diaminooctane |
| H$_2$NCH$_2$CH$_2$OCH$_2$CH$_2$NH$_2$, 2HCl | 2,2-oxybis (ethylamine) dihydrochloride |
| H$_2$NCH$_2$CH$_2$NHCH$_2$CH$_2$NH$_2$ | diethylenetriamine |
| (H$_2$NC$_6$H$_4$)$_2$SO$_2$ | Aminophenylsulfone |

Referring again to FIG. 3, the molecular structure of the LC4 and LC$_n$ type lubricants each contain a central hydrophilic portion A comprised of two polar groups, i.e., amide-containing moieties generally represented as —C(O)—NH— and —NH—(O)C—, separated by a chain segment. The amide moieties each contain highly electronegative, and thus highly polar oxygen (O) and nitrogen (N) atoms, and thus strongly bond the central hydrophilic portion A of the LC4 and LC$_n$ type lubricant molecules to the recording media surface (e.g., the protective overcoat) via dipole-dipole interactions at the contact interface. In addition to the bonding provided by the amide moieties, additional dipole-dipole surface bonding is provided by the oxygen (O) atoms of each of the ether linkages. The strong surface bonding of central portion A provided by the combination of amide moiety and ether linkage results in monolayer thicknesses (i.e., less than about 15 Å) of the lubricant, including a highly oriented, close-packed arrangement of bonded lubricant molecules with their respective symmetrically structured hydrophobic end portions B extending away from the media surface for providing lubricity and prevention of moisture penetration to the central bonding portion A, thereby reducing degradation of the dipole-dipole bonds. Moreover, the length of the chain segment between the polar amide bonding moieties can be easily changed from short to long and from hydrocarbon to fluorinated hydrocarbon, or a combination of both, by appropriate selection of the diamine reactant. Thus, the LC4 and LC$_n$ type lubricants can be tailored for optimum use with particular types of carbon-based protective overcoats.

The lubricant topcoat of the present invention can be applied to either the magnetic recording layer of the medium or to a conventionally applied protective overcoat, particularly a carbon-based overcoat, by exposing the surface receiving the lubricant topcoat to a vapor comprising the lubricant or by applying thereto a solution of the lubricant in an appropriate solvent, as by dipping thereinto. As for the former process, the inventive lubricants are advantageous in that, unlike conventional PFPE type lubricating oils, they comprise a very narrow molecular weight distribution or a single molecular weight species which permits greater control over vapor phase coating. As for the latter process, the inventive lubricants are advantageous in that they are soluble not only in conventional fluorinated solvents (e.g., Vertrel and PF 5060), but are soluble in common, inexpensive solvents such as ethyl acetate, ethanol, acetone, and mixtures thereof. Consequently, use of the inventive lubricants for dip coating of magnetic recording media can reduce cost as well as environmental pollution.

Figure 1:
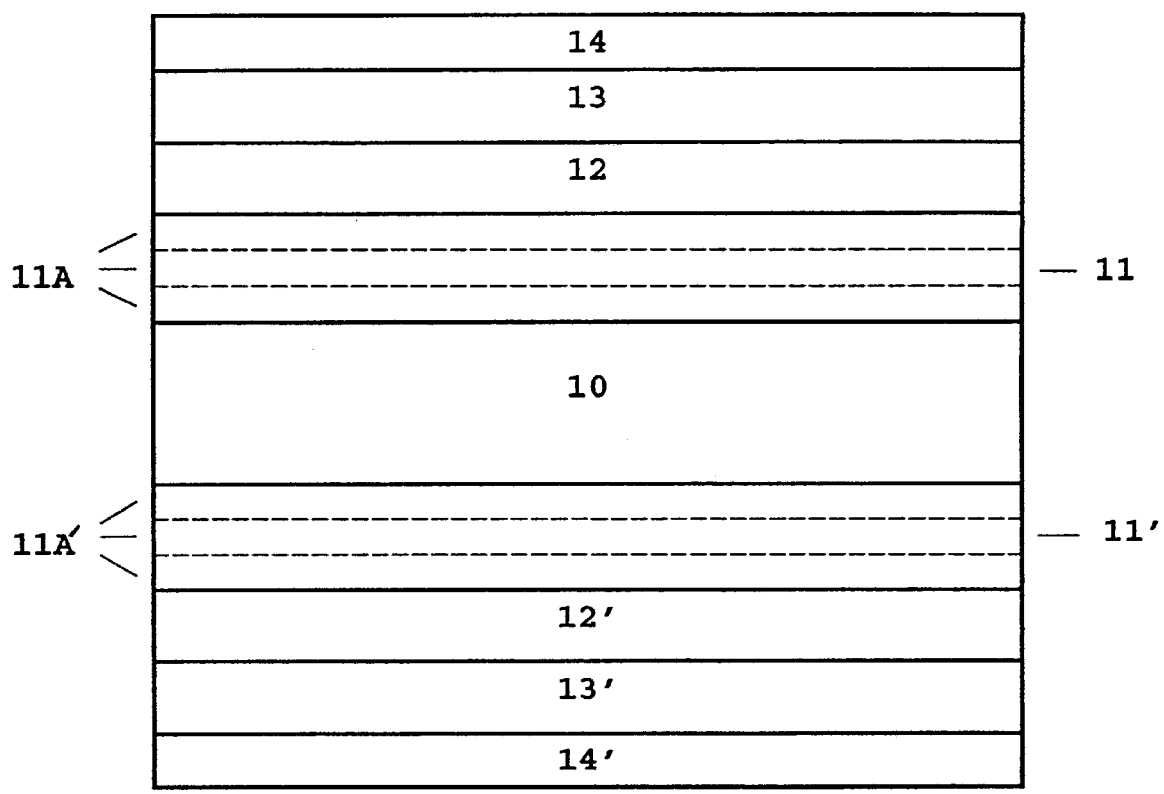
FIG. 1 schematically depicts, in cross-sectional view, a portion of a magnetic recording medium structure to which the present invention is applicable.

The present invention is not limited to any particular type of magnetic recording medium, but can be employed in any of various magnetic recording media, including those wherein the substrate or a subsequently deposited base layer has been textured, as by mechanical treatment or by laser techniques, and the textured surface substantially reproduced on subsequently deposited layers. Thus, a lubricant prepared in accordance with the present invention, can be applied to form a topcoat, such as topcoat 14 and 14' on the magnetic recording media depicted in FIG. 1, but is not necessarily limited thereto.

Only the preferred embodiment of the present invention and an example of its versatility is shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:

a non-magnetic substrate;

an underlayer on the substrate;

a magnetic layer on the underlayer; and a lubricant topcoat on the magnetic layer, wherein the lubricant topcoat comprises a lubricant having a molecular weight distribution of about 1 and having the formula:

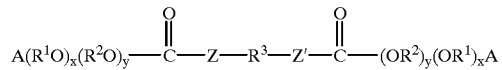

wherein:

A is alkyl, haloalkyl, alkoxy, or haloalkoxy;

R$^1$ and R$^2$ are independently C$_{1-10}$ fluoroalkyl, or C$_{1-10}$ perfluoroalkyl;

Z and Z' are NH;

x and y are between about 1 to about 10; and

R$^3$ is alkylene, halosubstituted alkylene or (R—J)$_m$—R'; wherein R and R' are independently alkylene or halo-substituted alkylene, J is NH, O, S, S—S, SO$_2$, C(O), or C(S) and m is 1–4.

2. The magnetic recording medium according to claim 1, wherein the lubricant comprises a single molecular weight species.

3. The magnetic recording medium according to claim 1, further comprising a protective overcoat on the magnetic layer and the lubricant topcoat on the protective overcoat.

4. The magnetic recording medium according to claim 3, wherein the lubricant comprises a single molecular weight species.

5. The magnetic recording medium according to claim 1, wherein the lubricant molecule has the formula:

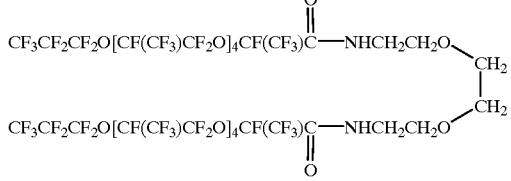

6. The magnetic recording medium according to claim 1, wherein the lubricant molecule has the formula:

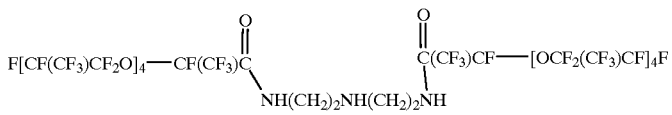

7. A method of manufacturing a magnetic recording medium, the method comprising the sequential steps of:
(a) depositing an underlayer on a non magnetic substrate
(b) depositing a magnetic layer on said underlayer;
(c) forming a protective overcoat layer over the magnetic layer; and
(d) depositing a lubricant layer on the protective overcoat layer to form a lubricant topcoat; wherein the lubricant topcoat comprises a lubricant having a molecular weight distribution of about 1 and having the formula:

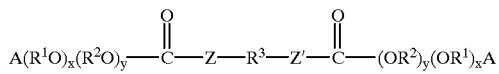

wherein:
A is alkyl, haloalkyl, alkoxy, or haloalkoxy;
$R^1$ and $R^2$ are independently $C_{1-10}$ fluoroalkyl, or $C_{1-10}$ perfluoroalkyl;
Z and Z' are NH;
x and y are between about 1 to about 10; and
$R^3$ is alkylene, halosubstituted alkylene or $(R-J)_m-R'$; wherein R and R' are independently alkylene or halo-substituted alkylene, J is NH, O, S, S—S, $SO_2$, C(O), or C(S) and m is 1–4.

8. The method according to claim 7, wherein:
step (b) comprises exposing the surface of the protective overcoat to a vapor comprising the lubricant.

9. The method according to claim 7, wherein:
step (d) comprises applying a solution of the lubricant in a solvent to the surface of the protective overcoat.

10. The method according to claim 9, wherein the solvent is selected from the group consisting of esters, ketones, alcohols, and fluorinated compounds.

11. The method according to claim 10, wherein the solvent is selected from the group consisting of ethyl acetate, ethanol, and acetone.

12. The method according to claim 7, wherein the lubricant molecule has the formula:

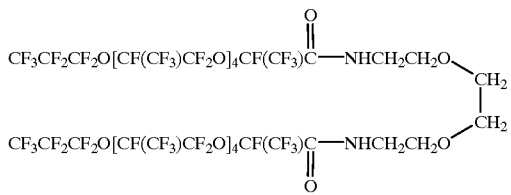

* * * * *